(12) United States Patent
Gioia et al.

(10) Patent No.: US 8,086,054 B2
(45) Date of Patent: Dec. 27, 2011

(54) METHOD FOR LOCALLY DECODING A BITSTREAM OF WAVELET COEFFICIENTS

(75) Inventors: Patrick Gioia, Servon sur Vilaine (FR); Loic Bouget, Rennes (FR)

(73) Assignee: France Telecom, Paris (FR)

( * ) Notice: Subject to any disclaimer, the term of this patent is extended or adjusted under 35 U.S.C. 154(b) by 1060 days.

(21) Appl. No.: 11/665,136

(22) PCT Filed: Sep. 30, 2005

(86) PCT No.: PCT/EP2005/054951
§ 371 (c)(1),
(2), (4) Date: Nov. 29, 2007

(87) PCT Pub. No.: WO2006/040270
PCT Pub. Date: Apr. 20, 2006

(65) Prior Publication Data
US 2008/0193027 A1    Aug. 14, 2008

(30) Foreign Application Priority Data
Oct. 14, 2004  (FR) ..................................... 04 10875

(51) Int. Cl.
*G06K 9/36* (2006.01)
*G06K 9/46* (2006.01)

(52) U.S. Cl. .................. 382/240; 382/233; 382/244

(58) Field of Classification Search ............. 382/233, 382/240, 241, 244; 345/419, 420, 423
See application file for complete search history.

(56) References Cited

U.S. PATENT DOCUMENTS

| 6,438,266 | B1 * | 8/2002 | Bajaj et al. | 382/243 |
| 6,931,155 | B1 * | 8/2005 | Gioia | 382/232 |
| 6,995,761 | B1 * | 2/2006 | Schroeder et al. | 345/419 |
| 2003/0169253 | A1 * | 9/2003 | Kim | 345/419 |

(Continued)

FOREIGN PATENT DOCUMENTS
WO    WO 03/009234    1/2003

OTHER PUBLICATIONS

Lavu et al., "Geometry compression of normal meshes using rate-distortion algorithms," Eurographics Symposium on Geometry Processing, 2003, pp. 52-61.*

(Continued)

*Primary Examiner* — Yubin Hung
(74) *Attorney, Agent, or Firm* — David D. Brush; Westman, Champlin & Kelly, P.A.

(57) ABSTRACT

A method is provided for decoding a data stream representing an object with at least three dimensions, associated with a basic mesh including of an assembly of facets defined by an assembly of vertices and ridges, and with wavelet coefficients corresponding to the local modifications of the basic mesh, indexed each by a vertex of the basic mesh. For at least some wavelet coefficients of the data stream, the method includes the following steps: determining an orientation of an edge bearing the vertex indexing the wavelet coefficients, called an orientation of the wavelet coefficient; and determining, based on the orientation, information for locating in the basic mesh at least one child of the wavelet coefficient, distinct locating rules being associated with each orientation, so as to extract a data stream of at least some of the wavelet coefficients, associated each with locating information.

16 Claims, 3 Drawing Sheets

U.S. PATENT DOCUMENTS

2004/0076331 A1* 4/2004 Gioia ............................ 382/232
2004/0208382 A1 10/2004 Gioia ............................ 382/240

OTHER PUBLICATIONS

Lechat et al. "Scalable Image Coding with Fine Granularity based on Hierarchical Mesh," SPIE 3653, 1999, pp. 1130-1142.*

Liu et al. "Wavelet based progressive mesh compression with random accessibility," Proc. Intl Symp. on Intelligent Multimedia, Video and Speech Processing, Oct. 2004, pp. 615-618.*

English Translation of International Preliminary Report on Patentability regarding counterpart foreign International Application No. PCT/EP2005/054951, filed Sep. 30, 2005.

Gioia et al., "Real-Time Reconstruction of Wavelet-Encoded Meshes for View-Dependent Transmission and Visualization," IEEE Transaction on Circuits and Systems for Video Technology, vol. 14, No. 7, Jul. 2004, pp. 1009-1020.

Moran et al., "Subdivision Surfaces in MPEG-4," Proceedings of the Int'l Conf. on Image Processing (ICIP 2002), vol. 2 of 3, Sep. 2002, pp. III-5 to III-8.

Gioia et al., "Real-Time Reconstruction of Wavelet Encoded Meshes for View-Dependent Transmission and Visualization," Proceedings of the Int'l Conf. on Image Processing (ICIP 2002), vol. 2 of 3, Sep. 2002, pp. III-9 to III-12.

Wim Sweldens, "The Lifting Scheme: A Construction of Second Generation Wavelets," SIAM Journal on Mathematical Analysis, vol. 29, No. 2, May 1995, pp. 1-42.

M. Lounsbery et al., "Multiresolution Analysis for Surfaces of Arbitrary Topological Type," ACM Transaction on Graphics, vol. 16, No. 1, Jan. 1997, pp. 34-73.

J. Shapiro, "Embedded Image Coding Using Zerotrees of Wavelet Coefficients," IEEE Trans. on Signal Proceedings, vol. 41, No. 12, Dec. 1993, pp. 3445-3462.

A. Khodakovsky, "Progressive Geometry Compression," (Siggraph 2000 Proceedings) and F. Moran et al., "Hierarchical Coding of 3D Models with Subdivision Surfaces," (IEEE ICIP 2000 Proceedings), 2002, pp. 1-8.

A. Said et al., "A New Fast and Efficient Image Codec Based on Set Partitioning in Hierarchical Trees," IEEE Transactions on Circuit and Systems for Video Technology, vol. 6, Jun. 1996, pp. 1-16.

* cited by examiner

METHOD FOR LOCALLY DECODING A BITSTREAM OF WAVELET COEFFICIENTS

CROSS-REFERENCE TO RELATED APPLICATION

This Application is a Section 371 National Stage Application of International Application No. PCT/EP2005/054951, filed Sep. 30, 2005 and published as WO 2006/040270 on Apr. 20, 2006, not in English.

FIELD OF THE DISCLOSURE

The field of the disclosure is that of the encoding of images and objects with at least three dimensions. More specifically, the disclosure relates to the transmission of data representing 3D scenes or 3D objects as well as their decoding for their subsequent reconstruction on a display screen. It can be used for example for the transmission of images or multimedia scenes via the Internet.

The disclosure can be applied especially in the field of the adaptive representation of 3D scenes (or scene objects) represented by meshes.

It falls more particularly within the context of the decoding and representation of objects of a graphic scene encoded by meshes by means of methods called "wavelet methods" implementing for example second-generation wavelets presented in Wim Sweldens, "The Lifting Scheme: A Construction of Second Generation Wavelets", SIAM Journal on Mathematical Analysis, Volume 29, number 2, pp 511-546, 1998.

BACKGROUND

It may be recalled that the methods called "wavelet encoding methods" are used to represent a mesh as a succession of details added to a base mesh. The general theory of this technique is described for example in M. Lounsbery, T. DeRose and J. Warren, "Multiresolution Analysis for Surfaces of Arbitrary Topological Type" (ACM Transaction on Graphics, Vol. 16, No. 1, pp. 34-73, January 1997).

The general principle of this technique consists in developing homeomorphism between an object to be encoded (such as a 3D mesh for example) and a simple mesh (more generally called in a "base mesh") in a base of particular functions called second-generation wavelets.

In this technique, a mesh is therefore represented by a sequence of coefficients that correspond to the coordinates in a wavelet base of a parametrization of this mesh by a simple polyhedron.

Thus, an object encoded according to this technique takes the form of the union of the following two elements:
- the base mesh, which generally comprises few facets, and represents a coarse version of the object to be encoded;
- the wavelet coefficients, which are triplets of real values assigned simultaneously to a precise zone of the base mesh and to a given level of subdivision of this mesh. These wavelet coefficients represent refinements to be made to the zone with which they are associated to converge towards the geometry of the initial object.

To enable the reconstruction of a representation of the encoded object on a display terminal, it is necessary to transmit on the one hand the base mesh and on the other hand the associated wavelet coefficients to this terminal.

There are several known techniques for the encoding of wavelet coefficients for transmission to a display terminal. Among these, the "zero-tree" encoding technique gives results that are particularly useful in terms of compression. Such a technique consists in describing an order of encoding of the wavelet coefficients which is predetermined and known in advance to the sender and receiver terminals (for example a server and a customer's display terminal). It can therefore be used in the transmission of the wavelet coefficients to prevent the transmission of information on sets of coefficients that are insignificant for the encoding of the object considered. The elimination of the insignificant coefficients enables a satisfactory level of compression to be achieved.

The techniques of "zero-tree" encoding make advantageous use of the fact that, at the finest levels of detail, the wavelet coefficients have smaller amplitude than wavelet coefficients associated with the coarser levels of subdivision.

Such zero-tree encoding operations are generally coupled with a "bitplane encoding" used, during the transmission of the coefficients, to transmit the most significant bits of each coefficient first. The requirements of progressivity of the encoding technique are thus met.

For a more detailed description of the zero-tree techniques, reference could be made to the articles by Jerome M. Shapiro, "Embedded Image Coding Using Zerotrees of Wavelet Coefficients" (IEEE Trans. Sig. Proc. 41(12), December 1993) and by A. Said, W. A. Pearlman, "A New, Fast, and Efficient Image Codec Based on Set Partitioning in Hierarchical Trees" (IEEE Trans. Circ. System. For Video Tech., 6(3), June 1996).

As explained in this article by A. Said and W. A. Pearlman, the zero-tree encoding/decoding algorithm, also called the SPIHT ("Set Partitioning in Hierarchical Trees") algorithm is used to obtain an overall binary representation of the set of wavelet coefficients, which contains sorting bits and bits coming from a binary representation of the coefficients. Applied to 2D wavelet image encoding, this SPIHT algorithm, during the decoding, reconstructs the hierarchy of the pixels of the image and distributes the bits as and when they are extracted from the bitstream.

The SPIHT algorithm, initially developed for the encoding of 2D images, has recently been applied to second-generation wavelet coefficients as described in A. Khodakovsky, P. Schröder and W. Sweldens, "Progressive Geometry Compression" (SIGGRAPH 2000 proceedings) and F. Moran and N. Garcia, "Hierarchical Coding of 3D Models with Subdivision Surfaces" (IEEE ICIP 2000 Proceedings).

Thus, for second-generation wavelets, a bitstream is obtained with the same type of format as in the case of the classic wavelets used for 2D image encoding.

As presented initially in the context of classic wavelet encoding of 2D images by A. Said and W. A. Pearlman in the above-mentioned article, the SPIHT algorithm necessitates the holding in memory of a table of the size of the image to be rebuilt, i.e. containing as many elements as wavelet coefficients. The inventors of the present patent application have established the fact that its adaptation to second-generation wavelets preserves this requirement; thus, in the case of partial or adaptive data transmission, the decoding of some wavelet coefficients necessitates the storage in memory of the entire hierarchy of the mesh associated with a 3D object or the multimedia scene to be rebuilt.

The SPIHT algorithm, applied to second-generation wavelet-encoded 3D objects, therefore has severe limits when it is sought to carry out an adaptive decoding of the transmitted object.

Now, an adapted decoding of this kind proves to be particularly promising for many applications, for example adaptive streaming of geographical terrains. In such an application, a user makes an interactive visit to a virtual geographical region, transmitted by a server on a communications network, such as the Internet for example. Depending on the region visited by the user, the server sends the restitution terminal only data that can be seen by this terminal. The relevance of the data is determined especially according to the user's viewpoint, his position in the virtual scene or a specific request made to the user, etc.

A first drawback of the prior art SPIHT algorithm, in the context of second-generation wavelet-encoded 3D objects, therefore lies in the need to keep the totality of the zero-tree hierarchy stored in memory. Indeed, a partial decoding of the bitstream calls for the creation in memory of the totality of the hierarchical structure, even when a part of this structure is designed to contain only zeros, only a part of the scene encoded in the bitstream being visible to the user or of interest to the user.

Another drawback of the prior art SPIHT algorithm, in the context of second-generation wavelet-encoding of 3D objects, is of an algorithmic nature.

Indeed, in an adaptive transmission, the following are the two phases of the reconstruction of a 3D scene or 3D object from a bitstream, to obtain a 3D mesh:
  the zero-tree decoding which, from the data bitstream, produces the wavelet coefficients;
  and an inverse wavelet transform which, on the basis of the wavelet coefficients extracted from the bitstream, produces a 3D mesh.

Classically, and as shown in FIG. 1, the wavelet coefficients 15, after zero-tree decoding, are stored in a cache 10, accompanied by a piece of locating information, expressed for example in the form of barycentric coordinates (F, A, B, C), where F is a facet of the base mesh on which the vertex indexing the wavelet coefficient is located and where A, B and C are barycentric coordinates of the vertex on the facet F. This locating information enables the reconstruction process 11 to integrate the corresponding wavelet coefficients in the 3D representation 12 independently.

One drawback of the prior art SPIHT technique for 3D objects therefore is that the reconstruction process 11 depends on the stopping of the decoding process 13. In other words, so long as the totality of the bitstream 14 has not been decoded 13, it is not possible to carry out an adaptive reconstruction of only that portion of the 3D object which is likely to interest the user.

A SPIHT technique of this kind therefore does not provide for an adaptive real-time viewing of 3D objects or scenes.

SUMMARY

A method is provided for the decoding of a bitstream representing an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex of said base mesh, said bitstream comprising at least some of said wavelet coefficients.

According to an embodiment of the invention, for at least some wavelet coefficients of said bitstream, a method of this kind implements the following steps:
  determining an orientation of an edge bearing said vertex indexing said wavelet coefficient, called orientation of the wavelet coefficients;
  determining, on the basis of said orientation, a piece of information for the locating, in said base mesh of at least one descendant of said wavelet coefficient, distinct locating rules being associated with each orientation so as to extract, from said bitstream, at least some of said wavelet coefficients, each associated with a piece of locating information.

Thus, an embodiment of the invention relies on a wholly novel and inventive approach to the decoding of a bitstream containing wavelet coefficients used for the reconstruction of a 3D object or a multimedia scene. An embodiment of the invention proposes the determining, as and when the bitstream is decoded, of a piece of locating information, for each wavelet coefficient, of its descendants also called children. In this way, these coefficients can be directly used during the reconstruction of the 3D object. It is therefore no longer necessary to have decoded the entire bitstream in order to have locating information associated with each wavelet coefficient, and therefore begin reconstruction of the representation of the 3D object, in applying the decoded wavelet coefficients to the base mesh.

The pieces of locating information associated with the wavelet coefficients and their descendants are thus computed during the decoding as a function of the orientation of the edge of the base mesh which bears the vertex indexing the wavelet coefficient. In other words, the orientation of a parent wavelet coefficient is determined and, from this, the computation rule to be applied to determine the piece of information for locating one of its descendants is deduced, as explained in greater detail here below in the document.

Since such a decoding enables direct accessing of the wavelet coefficients of the bitstream, associated with a piece of information enabling them to be located in the base mesh, an embodiment of the invention can be used for the adaptive real-time reconstruction of the 3D object thus encoded.

Furthermore, unlike in the prior art techniques, it is no longer necessary according to an embodiment of the invention to have a bulky intermediate structure in which to store the totality of the encoding hierarchy of the 3D object. The operation can be limited to decoding only the interesting portions of the bitstream and the storage in a cache of only the decoded wavelet coefficients associated with a piece of locating information, for the reconstruction of the 3D object.

Preferably, for said at least one descendant, if said piece of locating information expressed in an affine base does not meet at least one predetermined criterion, said method implements a step to modify said affine base so that said piece of locating information expressed in said modified affine base meets said at least one criterion.

According to an advantageous characteristic of an embodiment of the invention, a decoding method of this kind also comprises, for said at least one descendant, a subsequent step of reduction of said piece of locating information.

A reduction step of this kind can be used firstly to have uniqueness of the information for locating the wavelet coefficient at the output from the decoding method and secondly to reduce as far as possible the memory space occupied by this locating information.

Advantageously, said wavelet coefficients are encoded according to a zero-tree type technique in said bitstream.

As indicated here above in this document, a zero-tree type technique of this kind makes it possible to obtain satisfactory results in terms of compression of the coefficients to be transmitted.

Preferably, for a wavelet coefficient indexed n, said piece of locating information comprises four parameters $(F(n), A(n), B(n), C(n))$, where $F(n)$ is a facet of said base mesh on which said vertex indexing said wavelet coefficient is situated, and where $A(n)$, $B(n)$ and $C(n)$ are integer multiples of barycentric coordinates of said vertex on said facet $F(n)$.

The affine base in which the piece of locating information is expressed therefore corresponds to the facet of the mesh in which the barycentric coordinates of the vertex indexing the wavelet coefficient are expressed.

According to an advantageous characteristic of an embodiment of the invention, a decoding method of this kind comprises a preliminary step for the initialization of said locating information, during which the value zero is assigned to said parameters(F(n), A(n), B(n), C(n)).

Advantageously, said orientation of said wavelet coefficient indexed n is given by the formula:

Orientation=(!(A(n)%2))+2*(!(B(n)%2))+3*(!(C(n)%2))

where % is the operator of the remainder of the Euclidean division, ! is the Boolean negation operator, and where A(n), B(n) and C(n) are the barycentric coordinates (or multiples of these coordinates) of the wavelet coefficient with an index n in the facet F(n) of the mesh.

Preferably said piece of information for locating said descendants of said wavelet coefficient is determined according to the following formulae (where the index n designates the parent wavelet coefficient and m designates its descendant):

for a first descendant of said wavelet coefficient:
   if the orientation of said wavelet coefficient is equal to 1:

$F(n)=F(m)$ $A(n)=2*A(m)$ $B(n)=2*B(m)+1$ $C(n)=2*C(m)-1;$ if the orientation of said wavelet coefficient is equal to 2:

$F(n)=F(m)$ $A(n)=2*A(m)-1$ $B(n)=2*B(m)$ $C(n)=2*C(m)+1;$ if the orientation of said wavelet coefficient is equal to 3:

$F(n)=F(m)$ $A(n)=2*A(m)+1$ $B(n)=2*B(m)-1$ $C(n)=2*C(m);$ for a second descendant of said wavelet coefficient:
   if the orientation of said wavelet coefficient is equal to 1:

$F(n)=F(m)$ $A(n)=2*A(m)$ $B(n)=2*B(m)-1$ $C(n)=2*C(m)+1;$ if the orientation of said wavelet coefficient is equal to 2:

$F(n)=F(m)$ $A(n)=2*A(m)+1$ $B(n)=2*C(m)$ $C(n)=2*C(m)-1;$ if the orientation of said wavelet coefficient is equal to 3:

$F(n)=F(m)$ $A(n)=2*A(m)-1$ $B(n)=2*B(m)+1$ $C(n)=2*C(m);$ for a third descendant of said wavelet coefficient:
   if the orientation of said wavelet coefficient is equal to 1:

$F(n)=F(m)$ $A(n)=2*A(m)+2$ $B(n)=2*B(m)-1$ $C(n)=2*C(m)-1;$ if the orientation of said wavelet coefficient is equal to 2:

$F(n)=F(m)$ $A(n)=2*A(m)-1$ $B(n)=2*B(m)+2$ $C(n)=2*C(m)-1$ if the orientation of said wavelet coefficient is equal to 3:

$F(n)=F(m)$ $A(n)=2*A(m)-1$ $B(n)=2*B(m)-1$ $C(n)=2C(m)+2$ for a fourth descendant of said wavelet coefficient, if it exists:
   if the orientation of said wavelet coefficient is equal to 1:

$F(n)=F(m)$ $A(n)=2*A(m)-2$ $B(n)=2*B(m)+1$ $C(n)=2*C(m)+1;$ if the orientation of said wavelet coefficient is equal to 2:

$F(n)=F(m)$ $A(n)=2*A(m)+1$ $B(n)=2*B(m)-2$ $C(n)=2*C(m)+1;$ if the orientation of said wavelet coefficient is equal to 3:

$F(n)=F(m)$ $A(n)=2*A(m)+1$ $B(n)=2*B(m)+1$ $C(n)=2*C(m)-2;$ where m designates the index of said wavelet coefficient and n designates the index of said descendant.

According to one advantageous characteristic of an embodiment of the invention, said piece of locating information does not meet said at least one predetermined criterion if said vertex indexing said wavelet coefficient is situated on a side of said base mesh.

Thus, said piece of locating information does not meet said at least one predetermined criterion if at least one of the parameters A(n), B(n) and C(n) of said wavelet coefficient is negative. When a vertex is situated on a side of the mesh, at least one of its barycentric coordinates is negative.

Preferably, at said step of reduction of said piece of locating information, said parameters A(n), B(n) and C(n) are divided by two so long as said parameters A(n), B(n) and C(n) are all even-parity values.

Thus, the smallest integer multiples of the barycentric coordinates of the wavelet coefficient having an index n are determined.

Advantageously, for each of the wavelet coefficients extracted from said bitstream, a decoding method of this kind also comprises a subsequent step of storage in a cache of said wavelet coefficient and said associated reduced piece of locating information,
in such a way that said stored wavelet coefficients can be used during a step of reconstruction of said object with at least three dimensions implementing an inverse wavelet transform.

Thus, the wavelet coefficients associated with a piece of information enabling them to be located in the base mesh are stored directly in the cache as and when they are decoded. It is therefore possible, on the basis of the information in this cache, to carry out the adaptive reconstruction in real-time of a representation of the 3D object or of the multimedia scene considered without its being necessary to perform a preliminary decoding of the totality of the bitstream.

Preferably, such a decoding method is implemented in the context of an SPIHT (<<Set Partitioning In Hierarchical Trees>>) type algorithm for sorting the wavelet coefficients of said bitstream.

An embodiment of the invention also pertains to a device for the decoding of a bitstream representing an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex of said base mesh, said bitstream comprising at least some of said wavelet coefficients.

According to an embodiment of the invention, for at least some wavelet coefficients of said bitstream, a decoding device of this kind implements the following means:
means for determining an orientation of an edge bearing said vertex indexing said wavelet coefficient, called orientation of the wavelet coefficients;
means of determining, on the basis of said orientation, a piece of information for the locating, in said base mesh, of at least one descendant of said wavelet coefficient, distinct locating rules being associated with each orientation
in such a way as to extract, from said bitstream, at least some of said wavelet coefficients, each associated with a piece of locating information.

An embodiment of the invention also relates to a terminal for the restitution of an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex of said base mesh, said terminal comprising means of reception of a bitstream comprising at least some of said wavelet coefficients.

According to an embodiment of the invention, for at least some wavelet coefficients of said bitstream, a restitution terminal of this kind implements the following means:
means for determining an orientation of an edge bearing said vertex indexing said wavelet coefficient, called orientation of the wavelet coefficients;
means of determining, according to said orientation, a piece of information for the locating, in said base mesh, of at least one descendant of said wavelet coefficient, distinct locating rules being associated with each orientation,
and in that said terminal comprises means of storage in a cache of said wavelet coefficients, each associated with a piece of locating information, and means of reconstruction of said object with at least three dimensions implementing an inverse wavelet transform.

An embodiment of the invention also pertains to a computer program product comprising program code instructions recorded on a carrier usable in a computer and designed for the decoding of a bitstream representing an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex of said base mesh, said bitstream comprising at least some of said wavelet coefficients.

According to an embodiment of the invention, a computer program product of this kind comprises computer readable programming means for the performance, for at least some wavelet coefficients of said bitstream, of:
a step for determining an orientation of an edge bearing said vertex indexing said wavelet coefficient, called orientation of the wavelet coefficients;
a step for determining, on the basis of said orientation, a piece of information for the locating, in said base mesh, of at least one descendant of said wavelet coefficient, distinct locating rules being associated with each orientation,
in such a way as to extract, from said bitstream, at least some of said wavelet coefficients, each associated with a piece of locating information.

Other features and advantages of embodiments of the invention shall appear more clearly from the following description, given by way of a simple illustrative and non-restrictive example, and from the appended figures.

DETAILED DESCRIPTION OF ILLUSTRATIVE EMBODIMENTS

The general principle of an embodiment of the invention relies on the direct determining, during the decoding of a bitstream, of locating information associated with a wavelet coefficient and its descendants, as a function of the orientation, in the base mesh, of the edge with which the parent coefficient is associated.

Figure 2:
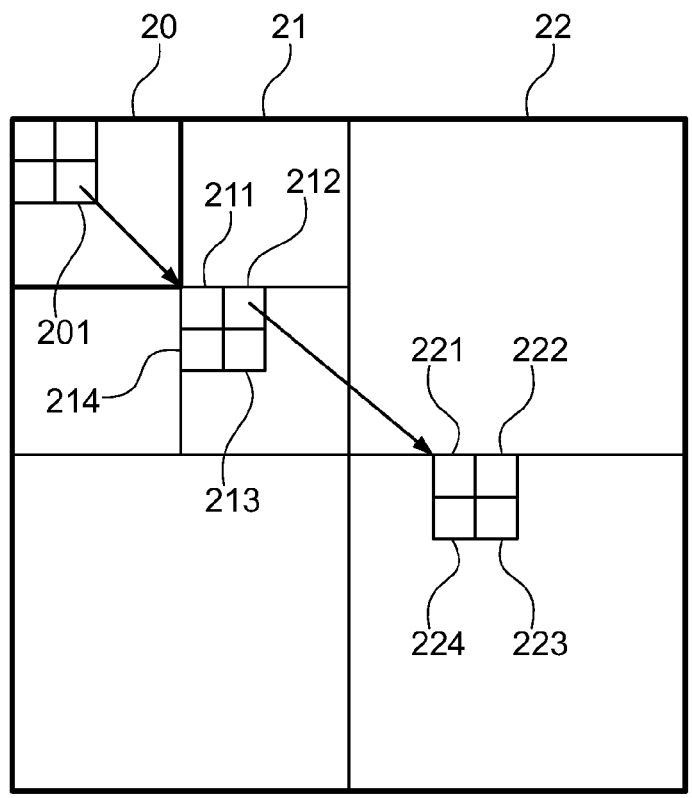
FIG. 2 is an illustration, according to the prior art, of the hierarchical structure of an image in the context of the SPIHT algorithm for the encoding of 2-D images.
Figure 4:
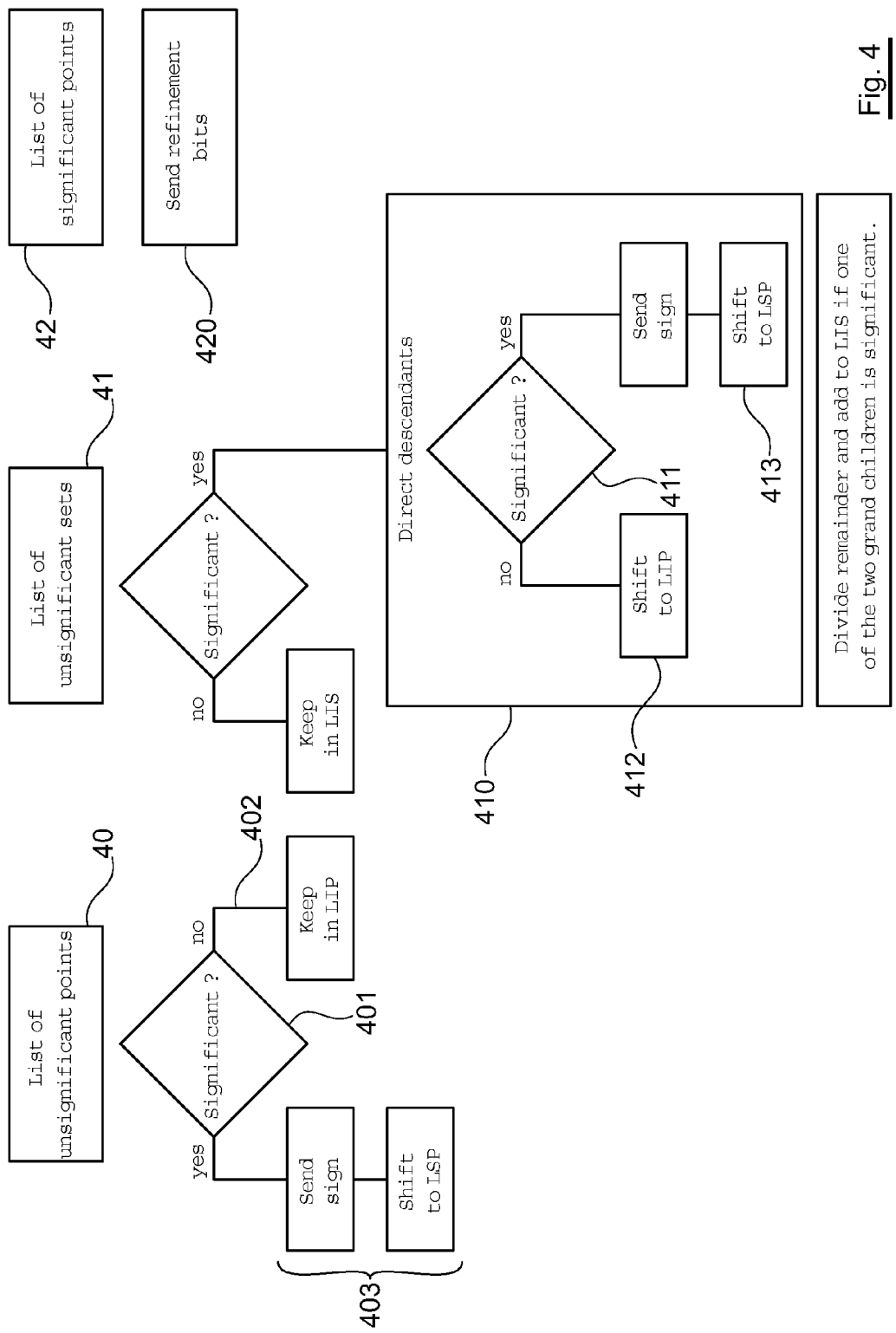
FIG. 4 is a flow chart of the prior art SPIHT algorithm.

For a clearer understanding of this principle, referring to FIGS. 2 and 4, we shall first recall the technique of the SPIHT algorithm, presented by A. Said and W. A. Pearlman in "A New, Fast, and Efficient Image Codec Based on Set Partitioning in Hierarchical Trees" (IEEE Trans. Circ. System For Video Tech., 6(3), June 1996) for the encoding of 2D images.

FIG. 2 presents the hierarchical structure of a 2D image used in the prior art SPIHT algorithm. A tree structure, or tree, defines the spatial relationships in the hierarchical pyramid associated with the image. FIG. 2 shows such a tree in the case of a pyramid built by recursive subdivision of the 2D image into four subbands. Each node of the tree corresponds to a pixel of the image and is identified by the coordinates of the pixel in the image. Its direct descendants correspond to the pixels having a same spatial position in the next refinement level of the pyramid. The tree is defined in such a way that each node has either no descendant or four descendants that always form a group of 2×2 adjacent pixels. In FIG. 2, the arrows are oriented from the parent node towards its four children. The pixels of the highest level of the pyramid form the roots of the tree and are also grouped in sets of 2×2 adjacent pixels.

Thus, the pixel referenced 201 of the subdivision level 20 of the image has four child-pixels referenced 211 to 214 in the next subdivision level 21. The child referenced 212 itself has four descendants referenced 221 to 224 in the next subdivision level of the hierarchical pyramid.

FIG. 4 is a flowchart of the SPIHT algorithm for the decoding of the bitstream, enabling the passage, for a 2D image, from the bitstream to a set of wavelet coefficients. The detailed algorithm can be found in the article by A. Said and W. A. Pearlman in "A New, Fast, and Efficient Image Codec Based on Set Partitioning in Hierarchical Trees" (IEEE Trans. Circ. System For Video Tech., 6(3), June 1996).

The principle of this algorithm relies on the use and management of three ordered lists storing the relevance information on each pixel of the image. These three lists are:
the LIS (List of Insignificant Sets) 41;
the LIP (List of Insignificant Pixels) 40;
the LSP (List of Significant Pixels) 42.

At initialization, the LSP 42 is initialized with an empty list, and the LIS 41 and the LIP 40 are initialized at all the roots of the hierarchy of FIG. 2.

At a given level of subdivision, the list LIP 40 of all the insignificant pixels is scanned for the rendering of the image and it is determined 401 whether, given the relevance threshold associated with this level of subdivision, the wavelet coefficient associated with one of the pixels must henceforth be considered to be relevant. If the response is negative 402, this pixel is left in the LIP list 40. If the response is positive 403, then the value of the wavelet coefficient is sent and the pixel is shifted to the LSP list 42.

The same procedure is performed for the LIS list 41 of the sets of insignificant pixels. When the wavelet coefficient associated with a pixel is considered to be relevant, its direct descendants in the hierarchy are examined 410 to determine 411 whether they too are relevant or not and hence to decide if they must be shifted 413, 412 to the LSP list 42 or LIP list 40.

The set of wavelet coefficients associated with the pixels of the LSP list 42 are extracted and sent 420 in the form of refinement bits to be used during the reconstruction of the image.

An embodiment of the present invention forms part of the context of the application of this SPIHT algorithm to the 3D objects encoded by meshes and second-generation wavelets (it may be recalled that a wavelet is said to be a second-generation wavelet if it is a wavelet enabling the encoding of semi-regular meshes as opposed to the classic wavelets which encode the pixels of a 2D image).

Figure 3:
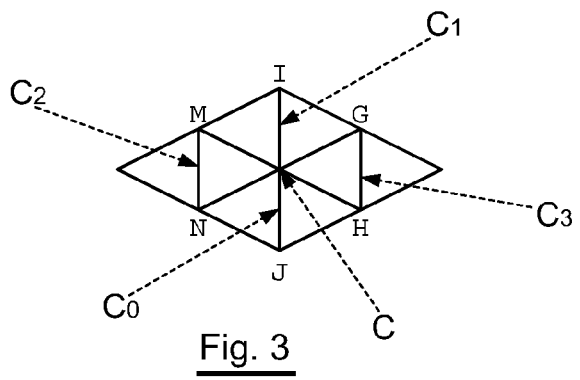
FIG. 3 provides a description, according to an embodiment of the invention, of the hierarchical structure of a mesh in the context of the application of the SPIHT algorithm to the encoding of semi-regular meshes (associated with 3D objects)

FIG. 3 illustrates the hierarchical structure used in this context for the encoding of meshes. Each wavelet coefficient is bijectively associated with an edge of the base mesh and is indexed by the vertex forming the midpoint of this edge. In the base mesh, the midpoint of each edge is therefore associated with a wavelet coefficient, which is the root of a sub-tree.

Each edge of the base mesh is the parent of four edges having a same orientation (i.e. parallel to it) in the refined mesh directly adjacent in the order of hierarchical subdivision.

Thus, in FIG. 3, the wavelet coefficient associated with the vertex C, midpoint of [IJ], has four descendants or children which are respectively associated with the following vertices:
$C_0$, midpoint of [CJ];
$C_1$, midpoint of [IC];
$C_2$, midpoint of [MN];
$C_3$, midpoint of [GH].

In one particular embodiment of the invention, to which the rest of this document shall be limited, a wavelet coefficient indexed n in the table of coefficients is identified in a hierarchical mesh of this kind by four parameters given by four functions $F(n)$, $A(n)$, $B(n)$ and $C(n)$. The first function indicates a facet of the base mesh on which the vertex indexing the coefficient is located. The other three coefficients $A(n)$, $B(n)$ and $C(n)$ are the smallest integer multiples of the barycentric coordinates of this vertex on the facet $F(n)$. For the sake of simplification, it is chosen to work with integer coordinates and therefore the barycentric coordinates, which may be decimal numbers, are not always manipulated. Here below, "barycentric coordinates" and "the smallest integer multiples of these coordinates" will be used loosely without any distinction being made between them.

The base mesh is a mesh comprising few facets and is designed to be refined as a function of the information borne by the wavelet coefficients.

To enable the application of the SPIHT algorithm to second-generation wavelet encoded 3D objects, the hierarchy of FIG. 2 must be replaced by that of FIG. 3 and the notion of a pixel must be replaced by that of a wavelet coefficient, or of a vertex of the mesh indexing this coefficient. It is in this context that an embodiment of the present invention is situated.

Figure 1:
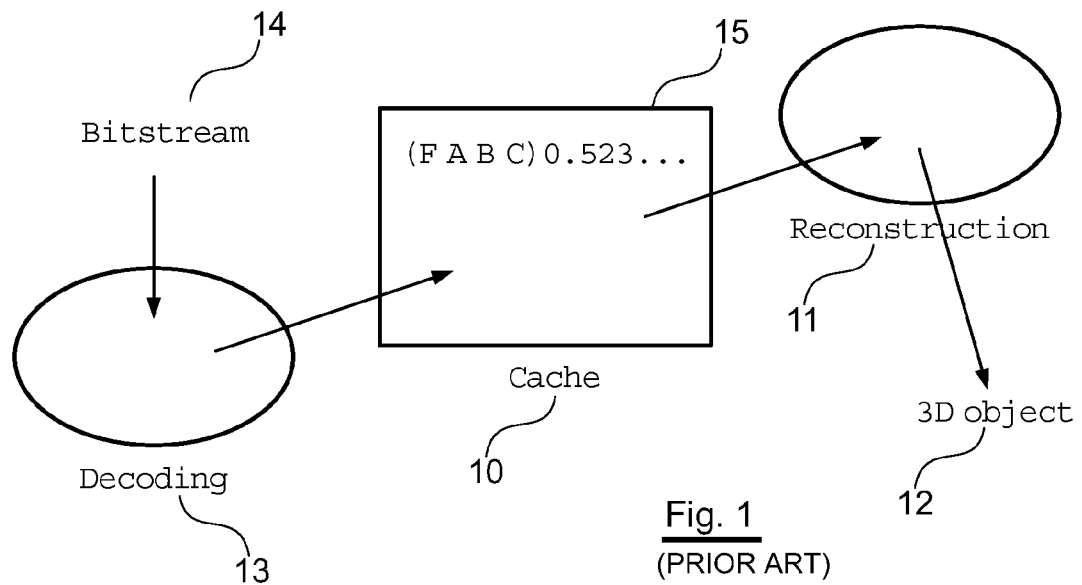
FIG. 1, already described with reference to the prior art, is a block diagram of the process of decoding a bitstream and of reconstruction of the 3D representation of the associated object.
Figure 5:
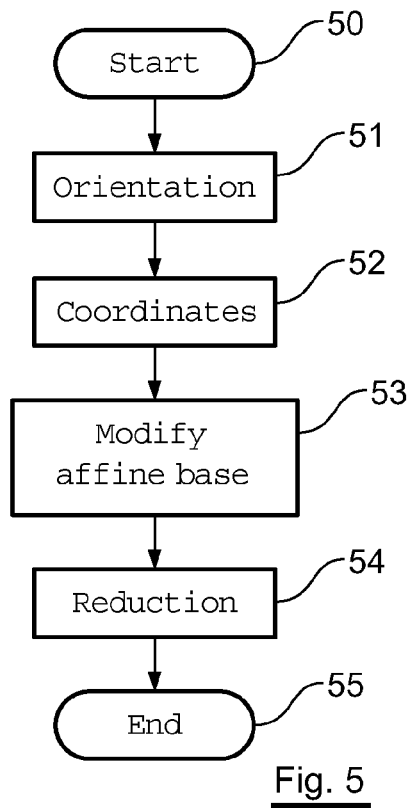
FIG. 5 illustrates steps implemented in the method for decoding a bitstream according to an embodiment of the invention.

In order to avoid the drawbacks of the SPIHT algorithm adapted to the encoding of 3D objects mentioned at the beginning of this document (the slowness and non-adaptivity of the reconstruction, linked to the need to store the totality of the hierarchy of 3D objects in a cache so that the reconstruction can begin), an embodiment of the invention consists in modifying this algorithm in such a way that, whenever a test is made on the descendants of a wavelet coefficient, the following procedure is performed: if at least one of the descendants does not exist in the cache 10 of FIG. 1, it is created in a memory and assigned a piece of locating information in the base mesh, which is determined according to the algorithm presented here below with reference to FIG. 5.

These coefficients may thus be directly used during the 3D reconstruction. Indeed, as soon as these wavelet coefficients are extracted from the bitstream and decoded, they are directly recorded in the cache 10 in such a way that they can be directly used for the reconstruction 11 of the 3D object 12.

Through the use of a zero-tree encoding technique, it is possible to decode only a part of the bitstream 14, corresponding to the visually relevant zones of the 3D object 12, given the user's viewpoint. In particular, the customer user may ask a server to send him only those parts of the bitstream 14 that correspond to the sub-trees, or zero-trees whose root is a visible edge of the region of the mesh that is of interest to him. Such a technique is described for example in the international patent application published under number WO 03/009234 and entitled( ) filed on behalf of the same applicants as those of the present patent application.

The cache 10 then contains only the wavelet coefficients 15 relevant to the reconstruction 11.

It is therefore no longer necessary to wait for the entire bitstream 14 to be decoded 13 to start the reconstruction phase 11, so that it is possible to envisage real-time applications.

In the embodiment of the invention described here below, the locating information associated with the wavelet coefficients takes the form of the quadruplet (F, A, B, C), where F is the face of the mesh on which the coefficient is located, and (A,B,C) are the smallest integer multiples of its barycentric coordinates on this face.

An embodiment of the invention therefore consists of the performance, during the decoding of the bitstream, of tests on the descendants of the wavelet coefficients to identify the totality of the hierarchy as a function of the quadruplets (F, A, B, C) of the descendants. It can therefore be used to perform maintenance on the cache 10 and obtain the association of the wavelet coefficients with their barycentric coordinates. In other words, an embodiment of the invention can be used for the direct management of the hierarchy of the wavelet coefficients in a cache used for reconstruction.

The different steps of the decoding algorithm of an embodiment of the invention are henceforth presented in greater detail, with reference to FIG. 5.

Portions of a bitstream are received at input to this algorithm. This bitstream contains at least the zero-tree encoded wavelet coefficients, associated with a multimedia scene or a 3D object (for example a terrain relief or a 3D avatar moving in a virtual environment). The steps of FIG. 5 are reiterated for each of the sub-trees or zero-trees to be decoded.

The first focus of interest, for example, is a first sub-tree whose root is a parent node of the base mesh indexed m.

In a first initialization step referenced 50, the new coordinates F(n), A(n), B(n) and C(n) are initialized to 0, n being the index of the descendant of the mode m whose coordinates it is sought to determine.

In a second orientation step 51, it is sought to determine the orientation of the wavelet coefficient indexed by the index node m according to the formula:

Orientation=(!($A(m)$%2))+2*(!($B(m)$%2))+3*(!($C(m)$%2))

where % is the operator of the remainder of the Euclidean division and ! is the Boolean negation operator.

Figure 6:
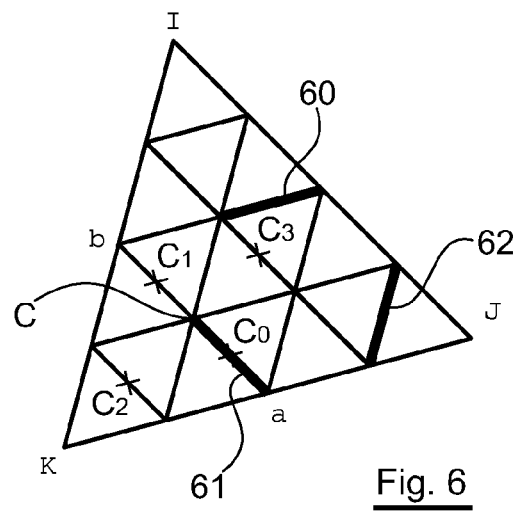
FIG. 6 illustrates the notion of orientation, as defined and used throughout this document.

It may be recalled that the notion of orientation as used and defined throughout this document depends on the orientation of the edge of the mesh whose midpoint is the vertex indexing the wavelet coefficient considered. Referring to FIG. 6, which illustrates the base mesh, the orientation of an edge is described by order of the vertices KJI of the base mesh. As illustrated in this figure, the mesh comprises three types of distinct edges:

- the edges referenced 60, which are parallel to (KJ), and whose orientation is equal to 1;
- the edges referenced 61, which are parallel to (JI), and whose orientation is equal to 2;
- the edges referenced 62, which are parallel to (KI), and whose orientation is equal to 3.

After determining the orientation of the wavelet coefficient C indexed m, a computation is made 52 of the coordinates of the children $C_0$, $C_1$, $C_2$ and $C_3$ of this coefficient in the hierarchical structure of FIG. 3.

The coordinates of the first child $C_0$ are computed according to the formulae:

$$F(n)=F(m)$$

$$A(n)=2*A(m)$$

$$B(n)=2*B(m)+1$$

$$C(n)=2*C(m)-1, \text{ if the orientation of the coefficient } C \text{ is equal to 1,}$$

$$F(n)=F(m)$$

$$A(n)=2*A(m)-1$$

$$B(n)=2*B(m)$$

$$C(n)=2*C(m)+1, \text{ if the orientation of the coefficient } C \text{ is equal to 2,}$$

$$F(n)=F(m)$$

$$A(n)=2*A(m)+1$$

$$B(n)=2*B(m)-1$$

$$C(n)=2*C(m), \text{ if the orientation of the coefficient } C \text{ is equal to 3.}$$

The coordinates of the second child $C_1$ are computed according to the formulae:

$$F(n)=F(m)$$

$$A(n)=2*A(m)$$

$$B(n)=2*B(m)-1$$

$$C(n)=2*C(m)+1, \text{ if the orientation of the coefficient } C \text{ is equal to 1,}$$

$$F(n)=F(m)$$

$$A(n)=2*A(m)+1$$

$$B(n)=2*B(m)$$

$$C(n)=2*C(m)-1, \text{ if the orientation of the coefficient } C \text{ is equal to 2,}$$

$$F(n)=F(m)$$

$$A(n)=2*A(m)-1$$

$$B(n)=2*B(m)+1$$

$$C(n)=2*C(m), \text{ if the orientation of the coefficient } C \text{ is equal to 3.}$$

The coordinates of the third child $C_2$ are computed according to the formulae:

$$F(n)=F(m)$$

$$A(n)=2*A(m)+2$$

$$B(n)=2*B(m)-1$$

$C(n)=2*C(m)-1$, if the orientation of the coefficient $C$ is equal to 1, $$F(n)=F(m)$$

$$A(n)=2*A(m)-1$$

$$B(n)=2*B(m)+2$$

$C(n)=2*C(m)-1$, if the orientation of the coefficient $C$ is equal to 2, $$F(n)=F(m)$$

$$A(n)=2*A(m)-1$$

$$B(n)=2*B(m)-1$$

$C(n)=2*C(m)+2$, if the orientation of the coefficient $C$ is equal to 3.

The coordinates of the fourth child $C_3$, if it exists, are computed according to the formulae:

$$F(n)=F(m)$$

$$A(n)=2*A(m)-2$$

$$B(n)=2*B(m)+1$$

$C(n)=2*C(m)+1$, if the orientation of the coefficient $C$ is equal to 1, $$F(n)=F(m)$$

$$A(n)=2*A(m)+1$$

$$B(n)=2*B(m)-2$$

$C(n)=2*C(m)+1$, if the orientation of the coefficient $C$ is equal to 2, $$F(n)=F(m)$$

$$A(n)=2*A(m)+1$$

$$B(n)=2*B(m)+1$$

$C(n)=2*C(m)-2$, if the orientation of the coefficient $C$ is equal to 3.

It is indeed possible for a wavelet coefficient to have fewer than four descendants, for example if it is situated on a side of the mesh. The fact of being situated on a side of the mesh can be determined by the fact that the zero-level parent-edge is crossed only once in the base mesh.

Referring to FIG. 6, it is recalled that the first child $C_0$ of the level j wavelet coefficient C is indexed by the level (j+1) vertex whose parent edge is [aC], where C is the midpoint of the edge [ab]. The second child $C_1$ of C is indexed by the level (j+1) vertex whose parent edge is [bC].

Furthermore, C belongs to at least six faces 2 of level (j+1) of which two faces have the vertex C as their sole intersection with the parent edge [ab]. These two faces have two potentially parent edges that do not contain C. The third child $C_2$ is such that $abC_2$ is oriented in the same sense as KJI. The fourth child $C_3$ is such that $abC_3$ is oriented in the other sense.

After the determining of the barycentric coordinates (or a multiple thereof) of the descendants of the wavelet coefficient indexed m, the sign of these coordinates is tested. If $A(n)<0$ or $B(n)<0$ or $C(n)<0$, then a modification must be made in the affine base 53, to express them on a facet of the mesh where these barycentric coordinates will be non-negative. The procedure follows the following algorithm:

```
For each face F' neighboring F(n) on the base mesh and so long as
    A(n)<0 or B(n)<0 or C(n)<0
    Compute F'(n), A'(n), B'(n) and C'(n) as described here below:
        If A'(n)>0 and B'(n)>0 and C'(n)>0 {
            F(n)=F'(n)
            A(n)=A'(n)
            B(n)=B'(n)
            C(n)=C'(n)
        }
}
```

The computation of F'(n), A'(n), B'(n) and C'(n) for its part is done as follows:

```
Let F0a[0], F0a[1] and F0a[2] be the vertices of F(n) and let F0b[0],
F0b[1] and F0b[2] be the vertices of F.
    F'(n)=F
    If A(n)+B(n)+C(n)==1 {
        ind1=2*(A(n)==1)+3*(B(n)==1)+4*(C(n)==1)-2
        ind2=(F0a[ind1]==F0b[0])+2*(F0a[ind1]==
            F0b[1])+3*(F0a[ind1]==F0b[2])
        if ind2==1
            A'(n)=1
            B'(n)=0
            C'(n)=0
        If ind2==2
            A'(n)=0
            B'(n)=1
            C'(n)=0
        if ind2==3
            A'(n)=0
            B'(n)=0
            C'(n)=1
    } else {
        if (F0a[0]==F0b[0] and F0a[1]==F0b[2]) {
            A'(n)=A(n)
            B'(n)=C(n)
            C'(n)=B(n)
        }
        if F0a[0]==F0b[1] and F0a[1]==F0b[0] {
            A'(n)=B(n);
            B'(n)=A(n);
            C'(n)=C(n);
        }
        if F0a[0]==F0b[2] and F0a[1]==F0b[1] {
            A'(n)=C(n);
            B'(n)=B(n);
            C'(n)=A(n);
        }
        if F0a[1]==F0b[0] and F0a[2]==F0b[2] {
            A'(n)=B(n);
            B'(n)=A(n);
            C'(n)=C(n);
        }
        if F0a[1]==F0b[2] and F0a[2]==F0b[1] {
            A'(n)=A(n);
            B'(n)=C(n);
            C'(n)=B(n);
        }
        if F0a[1]==F0b[1] and F0a[2]==F0b[0] {
            A'(n)=C(n);
            B'(n)=B(n);
            C'(n)=A(n);
```

-continued

```
    }
    if F0a[0]==F0b[0] and F0a[2]==F0b[1] {
        A'(n)=A(n);
        B'(n)=C(n);
        C'(n)=B(n);
    }
    if F0a[0]==F0b[2] and F0a[2]==F0b[0] {
        A'(n)=C(n);
        B'(n)=B(n);
        C'(n)=A(n);
    }
    if F0a[0]==F0b[1] and F0a[2]==F0b[2] {
        A'(n)=B(n);
        B'(n)=A(n);
        C'(n)=C(n);
    }
}
```

Thus the goal of this affine base modification step 53 is to find a face F of the mesh in which all the associated barycentric coordinates A, B and C are positive or zero. Since each affine base is associated with one face of the mesh, an affine base modification therefore amounts to making a change of face. By this modification, it is sought to express the coordinates of a mesh point as a function of the vertices of another face to which it belongs so that all the coordinates are positive or zero.

Finally, in a step referenced 54 for reduction of the coordinates, the following operation is carried out so long as A(n), B(n) and C(n) are all even-parity values:

$$A(n):=A(n)/2$$

$$B(n):=B(n)/2$$

$$C(n):=C(n)/2$$

In other words, if $\alpha$, $\beta$ and $\gamma$ designate the true barycentric coordinates of a vertex of the mesh, this gives by definition: $\alpha+\beta+\gamma=1$. According to an embodiment of the invention the work is done, during the decoding, with components that could be called extended barycentric coordinates A(n), B(n) and C(n), which are such that: $A(n)+B(n)+C(n)=2^j$, where j is a positive integer. Thus, we have:

$$A(n)=2^j\alpha$$

$$B(n)=2^j\beta$$

$$C(n)=2^j\gamma,$$

thus enabling the coordinates to be manipulated in the form of individual values without any loss of precision.

During the step 54 for the reduction of the coordinates, it is verified that A(n), B(n) and C(n) are truly the smallest integer multiples of the barycentric coordinates $\alpha$, $\beta$ and $\gamma$. This provides firstly for a uniqueness of the solution at the output 55 of the algorithm of FIG. 5 and, secondly, for the reduction as far as possible of the memory space occupied by the coordinates (for example in the cache memory 10).

The algorithm of FIG. 5 can be reiterated for each of the sub-trees of the bitstream to be decoded. It enables the tracking of the coordinates of the wavelet coefficients and their descendants during the running of the SPIHT type algorithm of FIG. 4, so as to minimize the memory space used and the management of the processes using a single cache memory.

An embodiment of the invention can be applied especially to the decoding of bitstreams representing terrain relief, in the context of the transmission and reconstruction of large-scale virtual environments. It may be recalled that, in this context, a variety of topographical readings are taken, enabling the construction of the base mesh, and aerial photographs are used to determine the texture to be associated with this base mesh in order to determine the wavelet coefficients.

An embodiment of the disclosure provides a technique for the decoding of a bitstream representing a 3D object that can be used to reconstruct 3D objects more rapidly than with prior art techniques, especially the SPIHT algorithm. A decoding technique of this kind that can be used for adaptive and a real-time viewing of a 3D object.

A decoding technique of this kind can provide for a gain in memory size as compared with prior art techniques.

An embodiment of the disclosure proposes a decoding technique, which does not necessitate the storage in an intermediate structure, of the totality of the decoded data before the start of the phase for reconstructing the representation of the 3D object.

An embodiment of the disclosure provides a decoding technique of this kind that enables a partial reconstruction of the 3D object, according to the wishes of a user.

An embodiment of the disclosure to propose a decoding technique of this kind that can be used to decode a bitstream of wavelet coefficients by an independent process for the reconstruction of the representation of the 3D object or of the associated multimedia scene.

Although the present disclosure has been described with reference to one or more embodiments, workers skilled in the art will recognize that changes may be made in form and detail without departing from the spirit and scope of the disclosure and/or the appended claims.

The invention claimed is:

1. Method for decoding a bitstream representing an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex forming a midpoint of one of the edges, said bitstream comprising at least some of said wavelet coefficients, wherein, for at least one wavelet coefficient of said bitstream, the decoding method comprises the following steps, at least one of which being performed by a computer:
  determining an orientation of an edge bearing said vertex indexing said at least one wavelet coefficient, called an orientation of the at least one wavelet coefficient;
  determining, on the basis of said orientation, a piece of information for locating, in said base mesh, at least one descendant of said at least one wavelet coefficient, distinct locating rules being associated with each orientation;
  extracting from said bitstream, said at least one descendent of said at least one wavelet coefficient associated with said piece of locating information; and
  displaying a reconstruction of said object with at least three dimensions on a display.

2. Decoding method according to claim 1 wherein, for said at least one descendant, if said piece of locating information expressed in an affine base does not meet at least one predetermined criterion, said method implements a step to modify said affine base so that said piece of locating information expressed in said modified affine base meets said at least one criterion.

3. Decoding method according to claim 1, wherein the method also comprises for said at least one descendant, a subsequent step of reducing said piece of locating information.

4. Decoding method according to claim 1, wherein said wavelet coefficients are encoded according to a zero-tree type technique in said bitstream.

5. Decoding method according to claim 1, wherein for a wavelet coefficient indexed n, said piece of locating information comprises four parameters, F(n), A(n), B(n), C(n), where F(n) is a facet of said base mesh on which said vertex indexing said wavelet coefficient is situated, and where A(n), B(n) and C(n) are integer multiples of barycentric coordinates of said vertex on said facet F(n).

6. Decoding method according to claim 5, wherein the method comprises a preliminary step for the initialization of said locating information, during which the value zero is assigned to said parameters, F(n), A(n), B(n), C(n).

7. Decoding method according to claim 5, wherein said at least one wavelet coefficient indexed n is given by the formula:

$$\text{orientation}=(!(A(n)\%2))+2*(!(B(n)\%2))+3*(!(C(n)\%2))$$

where % is the operator of the remainder of the Euclidean division and ! is the Boolean negation operator.

8. Decoding method according to claim 5, wherein said piece of information for locating said descendants of said at least one wavelet coefficient is determined according to the following formulae:

for a first descendant of said at least one wavelet coefficient:
  if the orientation of said wavelet coefficient is equal to 1:

$F(n)=F(m)$ $A(n)=2*A(m)$ $B(n)=2*B(m)+1$ $C(n)=2*C(m)-1;$ if the orientation of said wavelet coefficient is equal to 2:

$F(n)=F(m)$ $A(n)=2*A(m)-1$ $B(n)=2*B(m)$ $C(n)=2*C(m)+1;$ if the orientation of said wavelet coefficient is equal to 3:

$F(n)=F(m)$ $A(n)=2*A(m)+1$ $B(n)=2*B(m)-1$ $C(n)=2*C(m);$ for a second descendant of said wavelet coefficient:
  if the orientation of said wavelet coefficient is equal to 1:

$F(n)=F(m)$ $A(n)=2*A(m)$ $B(n)=2*B(m)-1$ $C(n)=2*C(m)+1;$ if the orientation of said wavelet coefficient is equal to 2:

$F(n)=F(m)$ $A(n)=2*A(m)+1$ $B(n)=2*B(m)$ $C(n)=2*C(m)-1;$ if the orientation of said wavelet coefficient is equal to 3:

$F(n)=F(m)$ $A(n)=2*A(m)-1$ $B(n)=2*B(m)+1$ $C(n)=2*C(m);$ for a third descendant of said wavelet coefficient:
  if the orientation of said wavelet coefficient is equal to 1:

$F(n)=F(m)$ $A(n)=2*A(m)+2$ $B(n)=2*B(m)-1$ $C(n)=2*C(m)-1;$ if the orientation of said wavelet coefficient is equal to 2:

$F(n)=F(m)$ $A(n)=2*A(m)-1$ $B(n)=2*B(m)+2$ $C(n)=2*C(m)-1$ if the orientation of said wavelet coefficient is equal to 3:

$F(n)=F(m)$ $A(n)=2*A(m)-1$ $B(n)=2*B(m)-1$ $C(n)=2*C(m)+2$ for a fourth descendant of said wavelet coefficient, if it exists:
  if the orientation of said wavelet coefficient is equal to 1:

$F(n)=F(m)$ $A(n)=2*A(m)-2$ $B(n)=2*B(m)+1$ $C(n)=2*C(m)+1;$ if the orientation of said wavelet coefficient is equal to 2:

$F(n)=F(m)$ $A(n)=2*A(m)+1$ $B(n)=2*B(m)-2$ $C(n)=2*C(m)+1;$ if the orientation of said wavelet coefficient is equal to 3:

$F(n)=F(m)$ $A(n)=2*A(m)+1$ $B(n)=2*B(m)+1$ $C(n)=2*C(m)-2;$ where m designates the index of said wavelet coefficient and n designates the index of said descendant.

9. Decoding method according to claim 2, wherein said piece of locating information does not meet said at least one predetermined criterion if said vertex indexing said at least one wavelet coefficient is situated on a side of said base mesh.

10. Decoding method according to claim 5, wherein:
for said at least one descendant, if said piece of locating information expressed in an affine base does not meet at least one predetermined criterion, said method implements a step to modify said affine base so that said piece of locating information expressed in said modified affine base meets said at least one criterion; and
said piece of locating information does not meet said at least one predetermined criterion if at least one of the parameters A(n), B(n) and C(n) of said wavelet coefficient is negative.

11. Decoding method according to claim 5, wherein the method also comprises for said at least one descendant, a subsequent step of reducing said piece of locating information and wherein at said step of reduction of said piece of locating information, said parameters A(n), B(n) and C(n) are divided by two so long as said parameters A(n), B(n) and C(n) are all even-parity values.

12. Decoding method according to claim 1, wherein the method also comprises for each of the wavelet coefficients extracted from said bitstream, a subsequent step of storage in a cache of said wavelet coefficient and said associated piece of locating information, in such a way that said stored wavelet coefficients can be used during a step of reconstruction of said object with at least three dimensions implementing an inverse wavelet transform.

13. Decoding method according to claim 1, wherein the method is implemented in the context of an SPIHT ("Set Partitioning In Hierarchical Trees") type algorithm for sorting the wavelet coefficients of said bitstream.

14. A device for decoding a bitstream representing an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex forming a midpoint of one of the edges, said bitstream comprising at least some of said wavelet coefficients, wherein said device comprises:
a computer configured by program code instructions to perform, for at least one wavelet coefficient of said bitstream, steps comprising:
determining an orientation of an edge bearing said vertex indexing said at least one wavelet coefficient, called an orientation of the at least one wavelet coefficient;
determining, on the basis of said orientation, a piece of information for locating, in said base mesh, at least one descendant of said at least one wavelet coefficient, distinct locating rules being associated with each orientation; and
extracting from said bitstream, said at least one descendent of said at least one said wavelet coefficient associated with said piece of locating information, and
a cache configured to store said at least one descendant extracted from said bit stream.

15. A terminal for restitution of an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex forming a midpoint of one of the edges, said terminal comprising,
an input for receiving a bitstream comprising at least certain of said wavelet coefficients;
a computer, which is configured by program code instructions to perform, for at least one wavelet coefficient of said bitstream, steps comprising:
determining an orientation of an edge bearing said vertex indexing said at least one wavelet coefficient, called an orientation of the at least one wavelet coefficient;
determining, according to said orientation, a piece of information for locating, in said base mesh, at least one descendant of said at least one wavelet coefficient, distinct locating rules being associated with each orientation,
a cache configured to store said at least one descendant of said at least one wavelet coefficient associated with said piece of locating information, which is extracted from said bit stream, and
a display, which displays a reconstruction of said object with at least three dimensions implementing an inverse wavelet transform.

16. A computer program product comprising program code instructions recorded on a non-transitory carrier usable in a computer and designed for decoding a bitstream representing an object with at least three dimensions, said object being associated with a base mesh constituted by a set of facets defined by a set of vertices and edges and with coefficients in a wavelet base corresponding to local modifications of said base mesh, called wavelet coefficients, each wavelet coefficient being indexed by a vertex forming a midpoint of one of the edges, said bitstream comprising at least some of said wavelet coefficients, wherein said program code instructions, when executed by said computer perform, for at least one wavelet coefficient of said bitstream, steps comprising:
determining an orientation of an edge bearing said vertex indexing said at least one wavelet coefficient, called an orientation of the at least one wavelet coefficient;
determining, on the basis of said orientation, a piece of information for locating, in said base mesh, at least one descendant of said at least one wavelet coefficient, distinct locating rules being associated with each orientation; and
extracting from said bitstream, said at least one descendent of said at least wavelet coefficient associated with said piece of locating information.

* * * * *